Feb. 26, 1957 H. A. SKIBBE 2,783,058
IMPLEMENT HITCH BRACE FOR TRACTORS
Filed Sept. 24, 1954
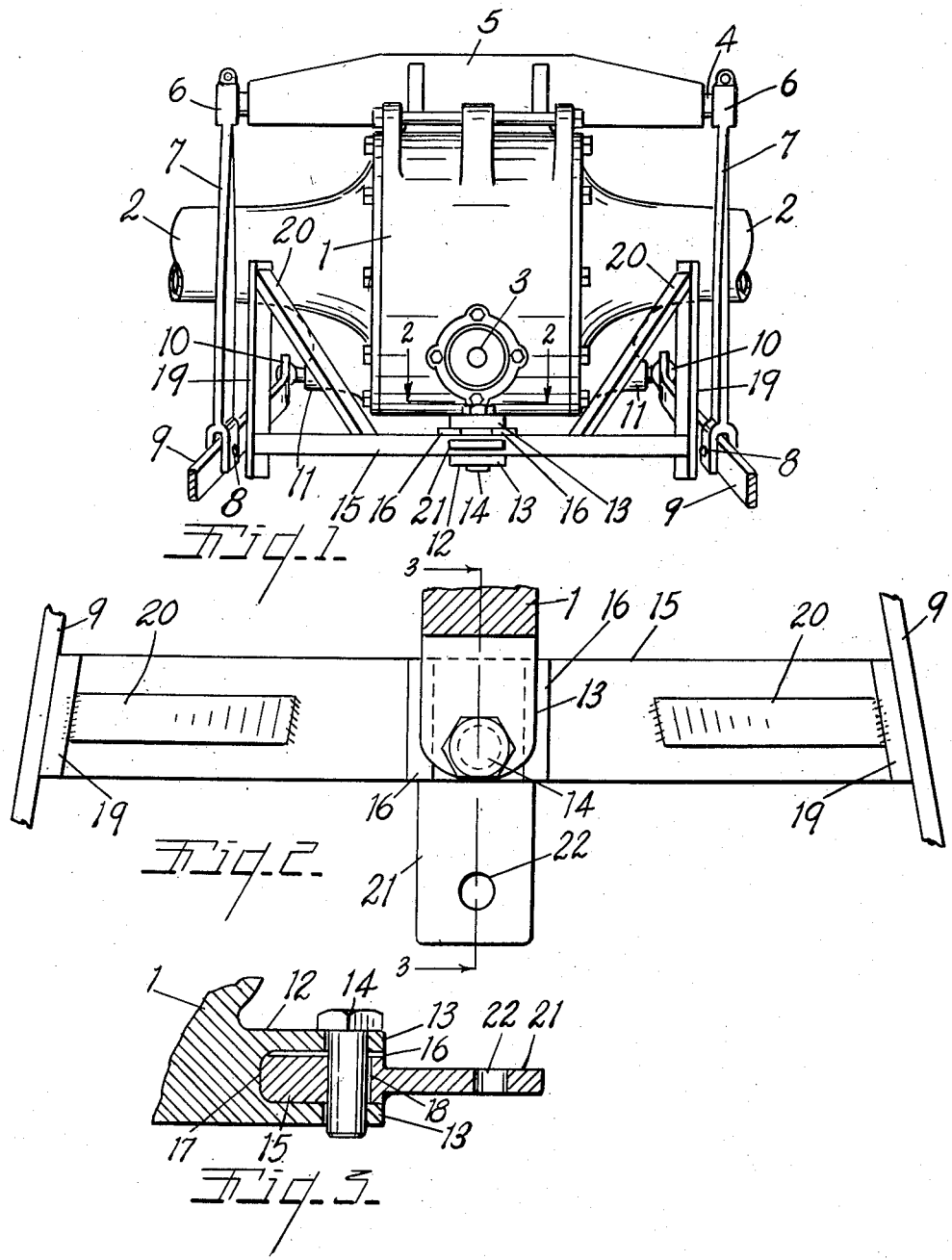
INVENTOR.
Harold A. Skibbe
BY
Otis A. Earl
ATTORNEY.

United States Patent Office 2,783,058
Patented Feb. 26, 1957

2,783,058

IMPLEMENT HITCH BRACE FOR TRACTORS

Harold A. Skibbe, Sodus, Mich.

Application September 24, 1954, Serial No. 458,144

4 Claims. (Cl. 280—474)

This invention relates to improvement in implement hitch brace for tractors. The principal objects of the invention are:

First, to provide a brace that is easily attached to tractors having spaced pull or hitch bars to guide the pull bars in vertical swinging motion while bracing the bars against lateral swinging motion.

Second, to provide a pull bar brace for tractors that is attachable to the standard clevis provided on the tractor and which includes an auxiliary hitch member to take the place of the clevis when the brace is mounted on the tractor.

Third, to provide a pull bar brace that is inexpensive to manufacture and which does not interfere with any of the operations of the tractor to which it is attached.

Other objects and advantages of the invention will be apparent from a consideration of the following description and claims. The drawings illustrate a highly practical form of the invention.

Fig. 1 is a fragmentary rear elevational view of a tractor with a brace embodying the invention attached thereto.

Fig. 2 is an enlarged fragmentary cross sectional view taken along the plane of the line 2—2 in Fig. 1 and illustrating the brace in plan view.

Fig. 3 is a fragmentary vertical cross sectional view taken along the plane of the line 3—3 in Fig. 2.

Present day farm tractors are equipped with what may be termed a three point power lift hitch for implements to be drawn by the tractor. A tractor of this type is illustrated in part. 1 is the differential housing and 2 the rear axle housings. 3 is a rearwardly projecting power take off connection. Laterally projecting power operated shafts 4 are mounted in a housing 5 on top of the differential housing and have rearwardly projecting crank portions 6 on their outer ends. The crank portions 6 are pivotally connected to lift rods 7 that extend downwardly and are pivotally connected at 8 to rearwardly diverging spaced pull bars 9. The pull bars are adapted by well known means (not illustrated) at their rear ends for attachment to implements to be drawn by the tractor.

The forward ends of the pull bars 9 are pivotally connected at 10 to bosses 11 projecting from the bottom of the differential housing at opposite sides thereof. The pivotal connections 10 are usually loose or free permitting considerable lateral swinging of the pull bars 9. In any case the pivotal connections at the front ends of the relatively long pull bars cannot be very effective in preventing lateral swinging of the rear ends of the pull bars. The result of this construction is that implements towed by the tractor may swing or move from side to side. This is objectionable particularly when cultivating crops as the implement can easily swing to tear out the crops rather than cultivate alongside of the crop.

Most tractors of the type described further have a clevis 12 formed as an integral part of or attached to the differential housing 1. The arms 13 of the clevis are horizontally parallel and vertically spaced and are further bored to receive the draft pin 14.

The brace of the present invention is attachable to tractors having the above described parts. The brace includes a horizontal bar or plate 15 that fits snugly between the arms 13 of the clevis. Where necessary or desirable the plate is provided with pads or shims 16 to make a close but removable fit. The forward or inner edge of the plate is ground or shaped as at 17 in the center to have a firm abutting engagement with the base of the clevis. The plate is further bored as at 18 to receive the draft pin 14 so that the pin holds the plate firmly against the base of the clevis.

The ends of the plate 15 are inclined in forwardly converging manner and upright guide plates 19 are welded to the ends of the cross plate to project above and below the cross plate with the outer sides of the guide plates positioned in the neutral planes of the pull bars 9. Angled braces 20 connect the tops of the guide plates 19 with the cross plate 15.

With the cross plate held against vertical tilting by the close fit of the plate between the arms 13 and with the cross plate held against horizontal swinging by reason of its formed forward edge 17 held against the base of the clevis by the pin 14, the guide plates 19 are fixedly supported and serve to prevent lateral swinging of the pull bars 9 while permitting full vertical adjustment of the pull bars. When in use the pull bars are connected and held against outward swinging motion by the implement to which they are connected and the implement is in turn controlled by the pull bars.

In order that the brace attachment will not hinder all normal usage of the tractor, the cross plate 15 is provided with an auxiliary draft ear 21 bored at 22 to receive a draft pin. When it is desired to pull an implement from a single center point the cross plate 15 need not be removed and it is only necessary to disconnect the spaced pull bars from the implement as would be necessary in any case and attach the same or a different implement to the auxiliary draft ear 21.

Having thus described the invention what is claimed to be new and what is desired to be secured by Letters Patent is:

1. In combination with a tractor having laterally spaced rearwardly diverging and projecting pull bars pivoted to the tractor and a draft clevis positioned rearwardly of the pivots of the bars, a pull bar brace comprising, a cross plate fitting snugly and removably in said clevis, the forward edge of the plate being shaped to abut the base of the clevis at transversely spaced points, said plate having a hole formed therein and receiving a draft pin passed through said clevis, upright guide plates secured to the ends of said cross plate with their outer faces converging forwardly in the neutral planes of said pull bars, and an auxiliary draft ear on the back of said cross plate.

2. In combination with a tractor having laterally spaced rearwardly projecting pull bars pivoted to the tractor and a draft clevis positioned rearwardly of the pivots of the bars, a pull bar brace comprising, a cross plate fitting snugly and removably in said clevis, the forward edge of the plate being shaped to abut the base of the clevis at transversely spaced points, said plate having a hole formed therein and receiving a draft pin passed through said clevis, upright guide plates secured to the ends of said cross plate with their outer faces in the neutral planes of said pull bars, and an auxiliary draft ear on the back of said cross plate.

3. A brace attachment for a tractor having rearwardly projecting laterally spaced pull bars pivoted thereto and a clevis positioned rearwardly of the pivots of the bars comprising, a cross plate having a center portion sized to fit snugly in the clevis and make line contact with the base of the clevis, said center portion having a hole formed therein to receive the draft pin through the clevis with the pin holding the plate against the base of the clevis, upright guide plates on the ends of said cross plate and having outer surfaces converging forwardly and adapted to lie in the neutral planes of said pull bars when said brace attachment is mounted on the tractor, and an auxiliary draft ear on the rear of said center portion.

4. A brace attachment for a tractor having rearwardly projecting laterally spaced pull bars pivoted thereto and a clevis positioned rearwardly of the pivots of the bars comprising, a cross plate having a center portion sized to fit snugly in the clevis and make line contact with the base of the clevis, said center portion having a hole formed therein to receive the draft pin through the clevis with the pin holding the plate against the base of the clevis, and upright guide plates on the ends of said cross plate and having outer surfaces adapted to lie in the neutral planes of said pull bars when said brace attachment is mounted on the tractor.

References Cited in the file of this patent

UNITED STATES PATENTS

| | | |
|---|---|---|
| 2,155,379 | Albertson | Apr. 25, 1939 |
| 2,494,757 | Hansen | Jan. 17, 1950 |
| 2,513,783 | Blessinger | July 4, 1950 |
| 2,534,109 | DeWitt | Dec. 12, 1950 |